(12) United States Patent
Palanisamy et al.

(10) Patent No.: US 11,924,579 B1
(45) Date of Patent: Mar. 5, 2024

(54) FPD-LINK IV VIDEO GENERATOR SYSTEM

(71) Applicant: N.S. International, Ltd., Troy, MI (US)

(72) Inventors: Karthikeyan Palanisamy, Troy, MI (US); Kumaresan Thiyagarajan, Troy, MI (US); Rajvel Murugesan, Troy, MI (US); Rajadeepan Murugesan, Troy, MI (US); Daniel Sanchez, Troy, MI (US); Slavko Bogoevski, Troy, MI (US); Syed Nabi, Troy, MI (US)

(73) Assignee: N.S. International, Ltd., Troy, MI (US)

( * ) Notice: Subject to any disclaimer, the term of this patent is extended or adjusted under 35 U.S.C. 154(b) by 0 days.

(21) Appl. No.: 18/372,839

(22) Filed: Sep. 26, 2023

(51) Int. Cl.
| | |
|---|---|
| H04N 7/18 | (2006.01) |
| G06F 1/18 | (2006.01) |
| G06F 13/38 | (2006.01) |
| G06F 13/40 | (2006.01) |
| G06F 13/42 | (2006.01) |
| H04N 7/10 | (2006.01) |
| H04N 17/00 | (2006.01) |

(52) U.S. Cl.
CPC ............ *H04N 7/102* (2013.01); *G06F 1/189* (2013.01); *G06F 13/382* (2013.01); *G06F 13/4027* (2013.01); *G06F 13/4282* (2013.01); *H04N 7/183* (2013.01); *H04N 17/004* (2013.01); *G06F 2213/0016* (2013.01); *G06F 2213/0042* (2013.01)

(58) Field of Classification Search
CPC ...... H04N 7/102; H04N 7/183; H04N 17/004; G06F 1/189; G06F 13/382; G06F 13/4027; G06F 13/4282; G06F 2213/0016; G06F 2213/0042
USPC .......................................................... 348/148
See application file for complete search history.

(56) References Cited

U.S. PATENT DOCUMENTS

| | | | | |
|---|---|---|---|---|
| 9,723,081 | B2* | 8/2017 | Loewel | H04L 67/12 |
| 10,559,877 | B2* | 2/2020 | DeMersseman | H04N 23/57 |
| 2016/0328272 | A1* | 11/2016 | Ahmed | G06F 9/4881 |
| 2020/0366135 | A1* | 11/2020 | Kim | H02J 50/12 |
| 2022/0147042 | A1* | 5/2022 | Trank | G08G 5/0013 |
| 2023/0205723 | A1* | 6/2023 | Takahashi | H04L 67/12 |
| | | | | 710/306 |

* cited by examiner

*Primary Examiner* — Trang U Tran
(74) *Attorney, Agent, or Firm* — Clark Hill PLC

(57) ABSTRACT

An apparatus for generating FPD-link IV signals in automobiles. The apparatus includes a USB to I2C converter allowing USB interfaced commands and Ethernet interfaced commands to configure and update a single board computer, an FPD-link IV Serializer and the single board computer that produce a video signal to FPD-link IV outputs. The single board computer stores video timing parameters (EDID) for the Device Under Test as well.

9 Claims, 1 Drawing Sheet

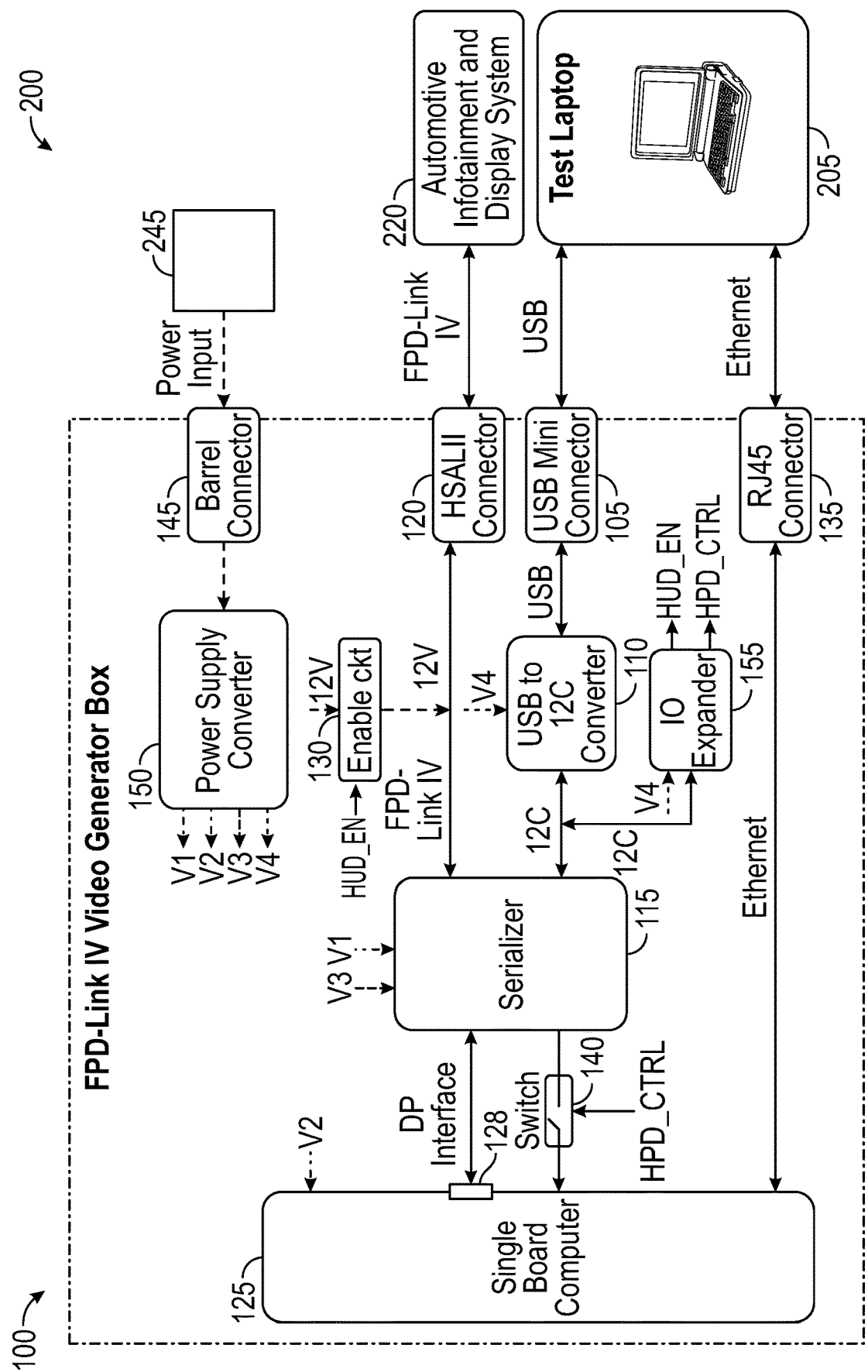

FPD-LINK IV VIDEO GENERATOR SYSTEM

FIELD OF THE INVENTION

The present invention generally relates to an apparatus and method of generating video signals. More specifically, the present invention relates to generating video signals in FPD-Link IV video format using an interface where instructions are received via a USB and Ethernet interfaces.

BACKGROUND OF THE INVENTION

FPD-link IV format has been recently introduced for flat panel displays in automobiles for the transmission of high definition video signals. This has become increasingly important as cameras have become more common, and even standard features, on many automobiles. Existing FPD-link IV systems generate FPD-link IV outputs only with FPGA based architecture with Display Serial Interface (DSI) as video input.

Another shortcoming of existing FPD-link IV generators is the inability to change the resolution of a video-output in real time.

Another shortcoming of existing FPD-link IV generators is the lack of a graphical user interface for modifying programs running on the generator in real time.

Therefore, there exists a heretofore unmet need for a system with Display Port (DP) based architecture that controls devices under test via a USB signal from a user control device that can upload video files to a computer through ethernet interface in the FPD-link IV Video generator system and be used with a customizable graphical user interface (GUI) and real-time resolution change features.

SUMMARY OF THE DISCLOSURE

The present invention is an apparatus and method for generating video signals. Specifically, the apparatus generates its own FPD-link IV output for an automobile after receiving configuration instructions via a USB and Ethernet interfaces.

One embodiment of the present disclosure is an FPD-link IV apparatus that includes: an FPD-link IV video generator apparatus including: a USB interface; a USB to I2C converter in communication with the USB interface; an FPD-link IV serializer in communication with the USB to I2C converter, where the FPD-link IV serializer has at least one output port; and a computer in communication with the FPD-link IV serializer over a first communication line. The computer may be a single board computer. The apparatus may also include an ethernet port in communication with the computer and an enable circuit in communication with the FPD-link IV serializer. The apparatus may also include a power input; and a power converter, where the power converter transmits electrical power to at least one of the USB to I2C converter, the second computer and the FPD-link IV serializer. The apparatus may also include a Hot Plug Detect (HPD) switch disposed between the computer and the FPD-link IV serializer on a second communication line; and an I/O expander in communication with the USB to I2C converter, wherein the hot plug detect (HPD) switch is configured to receive a signal from the I/O expander to indicate a display port sink available status to the computer.

Another embodiment of the present disclosure includes a system for providing media in FPD-link IV format to a device under test, the system including: a first computer with a memory and a display, wherein the memory contains a program that, when executed, configures the computer to provide a graphical user interface on the display; and an FPD-link IV video generator apparatus that includes: a USB interface; a USB to I2C converter in communication with the USB interface; and an FPD-link IV serializer in communication with the USB to I2C converter, where the FPD-link IV serializer has at least one output port; and a second computer in communication with the FPD-link IV serializer over a first communication line. The second computer may be a single board computer. The program on the memory of the first computer may be configured to modify programs on at least one of: the USB to I2C converter, the second computer, and the FPD-link IV serializer. The apparatus may also include an ethernet port in communication with first computer and the second computer; and an enable circuit in communication with the FPD-link IV serializer and a device under test. The system may include a hot plug detect switch disposed between the computer and the FPD-link IV serializer on a second communication line; and an I/O expander in communication with the USB to I2C converter, wherein the hot plug detect switch is configured to receive a signal from the I/O expander to indicate a display port sink available status to the computer. The apparatus may include a power input; and a power converter, where the power converter transmits electrical power to at least one of the USB to I2C converter, the second computer, and the FPD-link IV serializer; wherein the system further comprises a power source in communication with the power input.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 1 is a diagram of a video generator apparatus according to one embodiment of the present disclosure.

DETAILED DESCRIPTION OF THE DISCLOSURE

While this invention may be susceptible to embodiment in different forms, specific embodiments are shown in the drawings and will be described herein in detail with the understanding that the present disclosure is to be considered an exemplification of the principles of the invention and is not intended to limit the invention to that as illustrated.

Video signals have been generated for generations and provide many benefits in improving accessibility to and testing of video systems, such as in automobiles.

FIG. 1 shows a diagram for an embodiment of a video generator apparatus 100 includes a USB interface 105 in electrical communication with a USB to I2C converter 110. Suitable USB to I2C converter circuits must include I2C clock stretching capability. One suitable USB to I2C converter is a model FT4222HQ manufactured by Future Technology Devices International Limited, headquartered in Glasgow Scotland. The USB to I2C converter 110 is connected to an FPD-link IV Serializer 115 configured to convert an output transmitted from a display port 128 of a computer 125 to an FPD-link IV signal. The FPD-link IV Serializer 115 may have at least one FPD-link IV output port 120. One suitable serializer is a DS90UH983-Q1 manufactured by Texas Instruments, Inc. headquartered in Dallas, Texas. The computer 125 may be a single board computer configured to generate a video signal output through a display port 128 and transmit it. An exemplary and non-limiting suitable single board computer is Jetson Nano Module (part no. 900-13448-0020-000) manufactured by NVIDIA Corporation, headquartered in Santa Clara, California. The Jetson Nano Module may have NVIDIA Maxwell architecture with 128 NVIDIA CUDA cores (GPU), Quad-core ARM Cortex A57 MPCore processor (CPU), 4 GB 64-bit LPDDR4, 16 GB eMMC 5.1, Gigabit Ethernet, eDP 1.4, USB 3.0 and USB 2.0 interface components. The computer 125 may be in electrical communication with an ethernet port 135 to provide access to externally provided instructions and data, including video and image files. The computer 125 generates video signals transmitted through the display port 128 to the FPD-link IV serializer 115. The computer 125 may include instructions for input video timing configuration. The computer 125 may also include video timing parameters (EDID) for the device under test 220.

The apparatus 100 may include an enable circuit 130 configured to supply power to activate a device under test 220. In some embodiments, the enable circuit 130 may supply 12 volt power to the device under test.

The apparatus 100 may include an I/O expander 155 in communication with the USB to I2C converter 110. The I/O expander 155 may be configured to generate a signal to the enable circuit 130 to activate the device under test 220. The I/O expander 155 may also be configured to generate a signal to a hot plug detect (HPD) control switch 140 disposed in communication with and between the computer 125 and the FPD-link IV Serializer 115. The I/O expander 155 signal may be generated based on whether the FPD-link IV Serializer 115 has received or is receiving a configuration update. The hot plug detect control switch 140 may be configured to be in an open position before a configuration update is performed and closed during and after a configuration update is performed. The signal received from the FPD-link IV Serializer 115 through the hot plug detect control switch 140 indicates to the computer 125 whether it should generate a video signal out on its display port 128. This way, since the hot plug detect control switch 140 is open on start-up of the computer 125, the computer 125 cannot perform DP link training of the FPD-link IV Serializer 115 on start-up. The I/O expander 155 is configured to respond to a user command from a graphical user interface on a computer 205 (see below) and initiate a signal to the hot plug detect control switch 140 to close. With the hot plug detect control switch now closed, the computer 125 receives the signal from the FPD-link IV Serializer 115 to perform the DP link training. Upon successful completion of DP link training, the video signal from the computer 125 will be transmitted to the FPD-Link IV serializer 115 as per the video timing parameters (EDID) commanded from the computer 205.

The apparatus 100 may also include an input power port 145 in communication with a power converter circuit 150. The power converter circuit 150 may supply power at specific required voltages to other components in the apparatus 100, including the USB to I2C converter 110, the FPD-link IV Serializer 115, the I/O expander 155, and the computer 125.

The apparatus 100 may be used to form a system 200, also shown in FIG. 1, according to one embodiment of the present disclosure. The system 200 includes a power source 245, such as a battery or DC power supply, connected to the power input 145. The system 200 also includes a computer 205, such as a laptop, equipped with a memory and display and/or other peripheral devices for operation of the computer 205. The computer 205 may include a USB output configured to interface with the USB port 105 and an ethernet output configured to interface with the ethernet port 135. The communication over the USB port 105 allows the computer 205 to control the device under test 220, while communication over the ethernet port 135 allows the computer 205 to control the computer 125. The memory in the computer 205 may include a program that, when executed, instructs the computer 205 to display a graphical user interface (GUI) to allow a user to operate the computer 205 and transmit commands to add, edit, or delete configurations on one or more of the USB to I2C converter 110, the FPD-link IV Serializer 115, and IO expander 155. The GUI may also provide functionality for optical calibration, adding and removing videos, firmware updates, video controls (including flip screen and image selection), and changing resolution in real time. The computer 205 may include a USB communications port and be connect to the USB input 105. At least one device under test 220 may be connected to the FPD-link IV output ports 120. The computer 205 may include an ethernet port and be connected to the ethernet port 135 and communicate with the computer 125. The computer 125 may include video timing parameters (EDID) that may be activated based on commands received by the computer 205 through the GUI.

In operation, an input from the computer 205 communicated over the USB interface 105 is converted to I2C protocol by the USB to I2C converter 110 and transmitted to the FPD-link IV Serializer 115 and then to the device under test 220. A video signal generated by the computer 125 is communicated to the FPD-link IV Serializer 115, which converts the video to an FPD-link IV signal that is communicated to the device under test 220. The video signal may be generated from a file(s) existing on the computer 125 or downloaded to the computer 125 from the computer 205. In some embodiments, an instruction communicated over the USB interface 105 may configure or update the FPD-link IV Serializer 115. Throughout, the power converter 150 may supply electrical power to the various components of the apparatus 100 at a single or variety of voltages required for their operation.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:
1. An FPD-link IV video generator apparatus comprising:
 a USB interface;
 a USB to I2C converter in communication with the USB interface;

an FPD-link IV serializer in communication with the USB to I2C converter, where the FPD-link IV serializer has at least one output port; and a computer in communication with the FPD-link IV serializer over a first communication line; further comprising: a Hot Plug Detect (HPD) switch disposed between the computer and the FPD-link IV serializer on a second communication line; and an I/O expander in communication with the USB to I2C converter, wherein the hot plug detect (HPD) switch is configured to receive a signal from the I/O expander to indicate a display port sink available status to the computer.

2. The apparatus of claim 1, wherein the computer is a single board computer.

3. The apparatus of claim 1, further comprising:

an ethernet port in communication with the computer; and an enable circuit in communication with the FPD-link IV serializer.

4. The apparatus of claim 1, further comprising:

a power input; and a power converter, where the power converter transmits electrical power to at least one of the USB to I2C converter, the computer and the FPD-link IV serializer.

5. A system for providing media in FPD-link IV format to a device under test, the system comprising:

a first computer with a memory and a display, wherein the memory contains a program that, when executed, configures the computer to provide a graphical user interface on the display; and an FPD-link IV video generator apparatus comprising:

a USB interface;

a USB to I2C converter in communication with the USB interface;

an FPD-link IV serializer in communication with the USB to I2C converter, where the FPD-link IV serializer has at least one output port; and a second computer in communication with the FPD-link IV serializer over a first communication line; further comprising: a Hot Plug Detect (HPD) switch disposed between the second computer and the FPD-link IV serializer on a second communication line; and an I/O expander in communication with the USB to I2C converter, wherein the hot plug detect (HPD) switch is configured to receive a signal from the I/O expander to indicate a display port sink available status to the second computer.

6. The system of claim 5, wherein the second computer is a single board computer.

7. The system of claim 5, wherein the program on the memory of the first computer is configured to modify programs on at least one of: the USB to I2C converter, the second computer, and the FPD-link IV serializer.

8. The system of claim 5, wherein the apparatus further comprises:

an ethernet port in communication with first computer and the second computer; and an enable circuit in communication with the FPD-link IV serializer and a device under test.

9. The system of claim 5, wherein the apparatus further comprises:

a power input; and a power converter, where the power converter transmits electrical power to at least one of the USB to I2C converter, the second computer, and the FPD-link IV serializer;

wherein the system further comprises a power source in communication with the power input.

\* \* \* \* \*